United States Patent
Boudreau (10) Patent No.: US 8,453,830 B2
(45) Date of Patent: Jun. 4, 2013

(54) SLIDE AND WEAR PAD FOR ENDLESS BELT CONVEYOR

(76) Inventor: Jean-Marc Boudreau, Bathurst (CA)

( * ) Notice: Subject to any disclaimer, the term of this patent is extended or adjusted under 35 U.S.C. 154(b) by 26 days.

(21) Appl. No.: 12/197,203

(22) Filed: Aug. 22, 2008

(65) Prior Publication Data

US 2009/0057104 A1    Mar. 5, 2009

Related U.S. Application Data

(60) Provisional application No. 60/935,617, filed on Aug. 22, 2007.

(51) Int. Cl.
*B65G 15/00* (2006.01)

(52) U.S. Cl.
USPC .......................................... 198/841; 198/823

(58) Field of Classification Search
USPC .................................................. 198/823, 841
See application file for complete search history.

(56) References Cited

U.S. PATENT DOCUMENTS

| | | | | |
|---|---|---|---|---|
| 2,573,486 | A * | 10/1951 | Pollitz | ............................ 198/842 |
| 3,929,179 | A | 12/1975 | Hines | |
| 4,018,329 | A | 4/1977 | Jarvis | |
| 4,215,776 | A | 8/1980 | Esler | |
| 4,280,619 | A | 7/1981 | Ward et al. | |
| 4,290,761 | A | 9/1981 | Suginaka | |
| 4,444,660 | A * | 4/1984 | Karlsson | ........................ 210/386 |
| 4,944,385 | A | 7/1990 | Shelby | |
| 4,951,809 | A | 8/1990 | Boothe et al. | |
| 5,007,528 | A | 4/1991 | Hideharu | |
| 5,031,757 | A | 7/1991 | Draebel et al. | |
| 5,038,924 | A | 8/1991 | Stoll | |
| 5,350,053 | A | 9/1994 | Archer | |
| 5,584,767 | A | 12/1996 | Picchietti et al. | |
| 5,601,180 | A | 2/1997 | Steeber et al. | |
| 5,799,780 | A | 9/1998 | Steeb, Jr. et al. | |
| 5,826,703 | A | 10/1998 | Altemus, Jr. et al. | |
| 5,927,478 | A | 7/1999 | Archer | |
| 5,988,360 | A | 11/1999 | Mott | |
| 6,180,210 | B1 * | 1/2001 | Debus | ........................... 428/167 |
| 6,237,753 | B1 | 5/2001 | Walter et al. | |
| 6,349,817 | B1 | 2/2002 | Wadensten | |
| 6,685,541 | B2 * | 2/2004 | Brown et al. | .................... 451/41 |
| 6,854,593 | B2 | 2/2005 | Boudreau | |
| 7,124,879 | B1 * | 10/2006 | Maguire | .................... 198/690.2 |
| 7,530,362 | B2 * | 5/2009 | McCormick et al. | ......... 134/123 |
| 7,757,839 | B2 * | 7/2010 | Boudreau | ...................... 198/823 |
| 8,052,264 | B2 * | 11/2011 | Hays et al. | ....................... 347/88 |

FOREIGN PATENT DOCUMENTS

| | | |
|---|---|---|
| CA | 2327646 | 6/2002 |
| CA | 2517766 | 2/2007 |
| CA | 2552065 | 1/2008 |
| EP | 0406425 A1 | 1/1991 |

* cited by examiner

*Primary Examiner* — Douglas Hess
(74) *Attorney, Agent, or Firm* — Eugene F. Derényi; Fogler Rubinoff LLP (57) ABSTRACT

A wear pad for use on a slide of an endless track conveyor belt comprising an elongated body having a flat top surface for slidably supporting a conveyor belt during travel of the belt over the top surface between leading and trailing edges of the top surface, and a plurality of grooves having V-shaped cross-sections in said top surface extending between the leading and trailing edges of the body for discharging liquid falling onto the top surface, whereby drag between the wear pad and the belt is reduced.

11 Claims, 11 Drawing Sheets

SLIDE AND WEAR PAD FOR ENDLESS BELT CONVEYOR

CROSS REFERENCE TO RELATED APPLICATIONS

This application claims the benefit of priority from U.S. provisional application Ser. No. 60/935,617 filed Aug. 22, 2007.

FIELD OF THE INVENTION

The present invention relates to slides for supporting an endless belt conveyor. In particular, the present invention relates to wear pads for use on a slide of an endless belt conveyor.

BACKGROUND OF THE INVENTION

Slides, which have been referred to as idlers, have been used for some time to support conveyor belts. For example, U.S. Pat. No. 6,854,593 issued to Boudreau on Feb. 15, 2005, discloses a slide referred to therein as a pad-type idler, for slidably supporting a continuous conveyor belt. The pad-type idlers are supported on a metal support above a base. When conveying a liquid-containing substance, e.g. in the food processing industry, the presence of liquid can result in drag (skin friction drag) which can cause the belt to slow down or stop.

The Applicant's previously filed, pending application, Canadian Patent Application No. 2,552,065 (the "'065 application"), provides a solution to the above identified problem in the form of a simple conveyor slide wear pad, which reduces or eliminates the accumulation of liquid on the slide, and consequently drag between the belt and the slide. This wear pad has a plurality of square-shaped grooves in its top surface extending between the leading and trailing edges of the wear pad's body, thus allowing for the discharging of liquid that falls onto the top surface. Thus, drag between the wear pad and the belt is reduced.

Notwithstanding that the square-shaped grooves formed in the top surface of the wear pad disclosed in the '065 application reduces the drag between the wear pad and the belt, the shape of the grooves may allow particulate matter to become lodged in the grooves, resulting in damage to the belt.

Known slides used to support conveyor belts, such as that disclosed in the U.S. Pat. No. 6,854,593, have the wear pad fastened to a crossbar of the slide through the use of fasteners such as bolts or plugs. The locking mechanism used to secure the fastener so as to secure the wear pad to the crossbar, includes nuts and cotter pins. However, this structure leaves the base of the plug or bolt, which extends below the crossbar, exposed and subject to being damaged.

An additional feature of known slides is the use of return slides to support endless conveyor belts. The Applicant's Canadian Application No. 2,517,766 discloses a return slide which incorporates a convex wear pad (or bowed upwardly perpendicular to the path of travel of the belt). The shape of the top surface of the wear pad substantially reduces wear on the edges of the belt. However, the wear pads lack durability and longevity when used with conveyor belts travelling at speeds of 200 feet per minute, or more.

SUMMARY OF THE INVENTION

In one aspect, the present invention relates to a wear pad for use on a slide, wherein a plurality of V-shaped grooves are formed in the top surface of the wear pad, extending between the leading and trailing edges of the wear pad, thus allowing for the discharging of liquid carried by the conveyor, whereby drag between the wear pad and the belt is reduced.

In another aspect of the present invention, the application relates to a slide for use on an endless belt conveyor, the slide comprising a crossbar extending perpendicular to the path of travel of the endless belt; the top of the crossbar has sleeves with an open top and bottom formed into it and depending below the crossbar; a wear pad on the crossbar for supporting the belt during travel of the belt; the wear pad extending perpendicular to the path of travel of the belt and having a holes therethrough aligned with the sleeves of the crossbar; a plug in the hole extends into the sleeve in the crossbar; and a locking means is used to secure the wear pad to the crossbar; whereby the sleeve formed in the crossbar protects the plug from exposure, thus minimizing the damage that can arise to the plug.

In a further aspect of the present invention, a wear pad for use on a return slide for an endless belt conveyor is disclosed. The wear pad comprises a plurality of V-shaped grooves formed in the top surface of the wear pad. The V-shaped grooves extend from the trailing edge of the top surface of the wear pad and terminate prior to extending to the leading edge. Therefore, the grooves are open at the trailing edge, and closed at the end extending into the top surface of the wear pad. The speed of the belt travelling over the top surface of the wear pad creates an air flow that enters the V-shaped grooves through the open end, and by reason of the closed ends, creates air pressure between the belt and the wear pad, sufficient to lift the belt sufficiently to reduce the friction against the wear pad. Accordingly, the durability and longevity of the return slider is increased.

In another aspect, the invention relates to a wear pad for use on a slide of an endless track conveyor belt, the wear pad comprising: a n elongated body having a flat top surface for slidable supporting of a conveyor belt during travel of the belt over the top surface between leading and trailing edges of the top surface; and a plurality of V-shaped grooves in said top surface extending between the leading and trailing edges of the elongated body of the wear pad for discharging liquid falling onto the top surface; whereby drag between the wear pad and the belt is reduced.

The leading and trailing edges of the top surface can be bevelled, and the V-shaped grooves can extend between the bevelled edges. The V-shaped grooves can be parallel to each other and spaced apart by a distance greater than the width of the grooves.

In another aspect, the invention relates to a slide for use on an endless belt conveyor, the slide comprising a crossbar extending perpendicular to the path of travel of the endless belt; two sleeves formed in the top of the crossbar and depending below it; the sleeves being open at the top, flush with the top surface of the crossbar, and open at the bottom; a wear pad extending perpendicular to the path of travel of the belt is positioned on the crossbar for supporting the belt; two holes are formed through the wear pad aligned with the sleeves formed in the crossbar; a plug extends through the hole in the wear pad into the sleeve of the crossbar; a locking means is used to secure the plug, thus fastening the wear pad to the cross bar; whereby, the sleeve of the crossbar minimizes exposure of the plug, thus protecting it from damage.

The sleeve can further comprise two holes formed on opposite sides of the sleeve, positioned below the crossbar;
a bore is formed through the bottom of the plug;
the plug is inserted through the hole in the wear pad and into the sleeve of the crossbar, such that the holes in the sleeve and the bore in the plug are aligned;

the locking means comprises a cotter pin, whereby the cotter pin is inserted through the holes in the sleeve and the bore in the plug to secure the wear pad to the crossbar.

In yet another aspect, the invention relates to a wear pad for use on a return slide of an endless track conveyor belt, the wear pad comprising:

a top surface which is convex along its length for positioning beneath an endless belt with the wear pad extending perpendicular to the path of travel of the belt;

the top surface having a trailing and leading edge, perpendicular to the path of travel of the belt;

a plurality of grooves formed in the top surface of the wear pad;

the plurality of grooves having an open end at the trailing edge of the wear pad and extending along the top surface of the wear pad parallel to the direction of the endless belt; and the plurality of grooves having an open end extending from the trailing edge of the top surface of the wear pad and a closed end terminating in the top surface of the wear pad prior to the leading edge.

In another aspect, the invention relates to a return slide for use on an endless belt conveyor, said slide comprising, which includes a pair of rollers and an endless belt extending around said rollers:

a base extending perpendicular to the path of travel of the endless belt beneath the rollers;

a wear pad on the base for supporting the belt during travel of the belt beneath the rollers;

the wear pad having a top surface which is convex along its length for positioning beneath an endless belt with the pad extending perpendicular to the path of travel of the belt;

the wear pad having a leading and trailing edge, perpendicular to the path of travel of the belt;

a plurality of grooves formed in the top surface of the wear pad; and the plurality of grooves having an open end extending from the trailing edge of the top surface of the wear pad and a closed end terminating in the top surface of the wear pad prior to the leading edge.

BRIEF DESCRIPTION OF THE DRAWINGS

The embodiments of the present invention are described below with reference to the accompanying drawings in which.

DETAILED DESCRIPTION OF THE DRAWINGS

Figure 1:
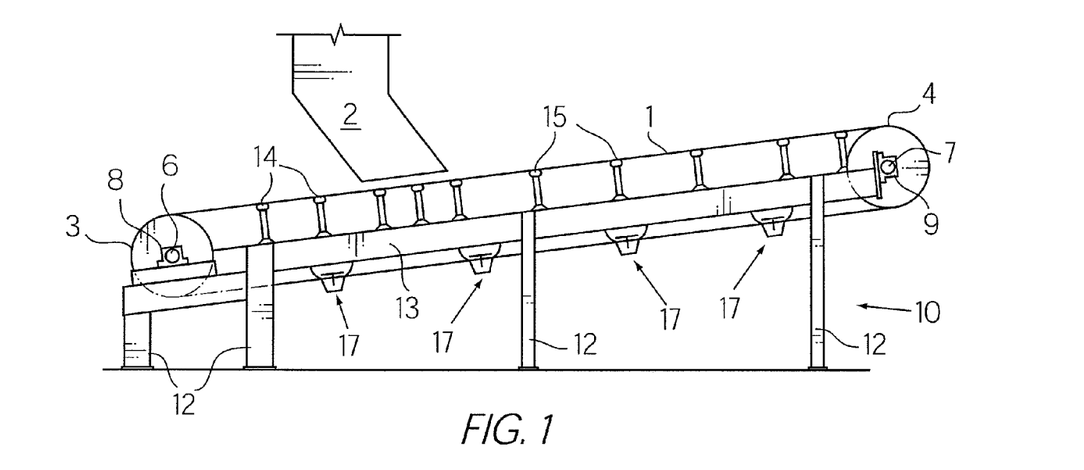
FIG. 1 is a schematic side view of an endless belt conveyor of the type which can employ a wear pad in accordance with the present invention.
Figure 2:
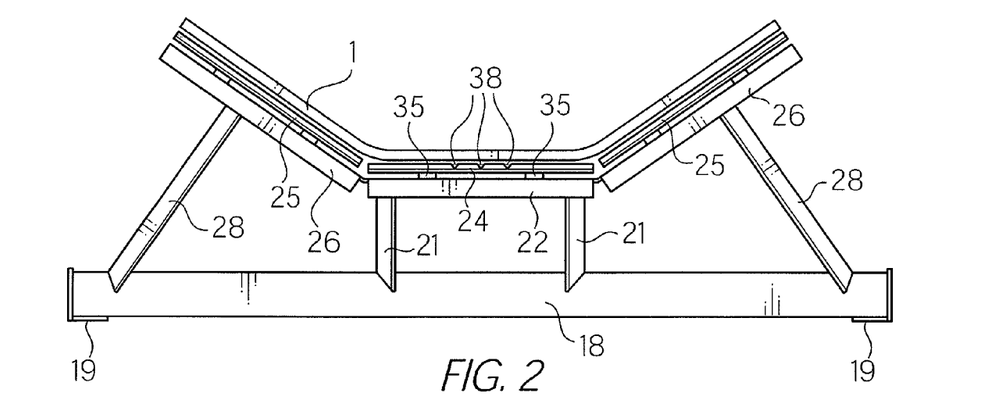
FIG. 2 is a front view of a slide assembly incorporating a wear pad in accordance with the present invention.
Figure 3:
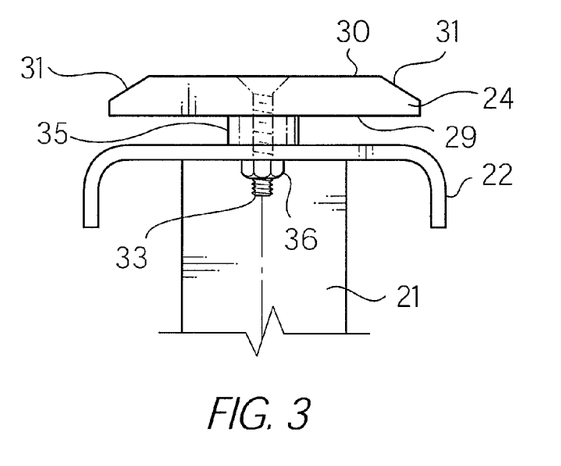
FIG. 3 is an end view of the wear pad of FIG. 2 mounted on a crossbar of the slide assembly of FIG. 2.

Referring to FIG. 1, the slide and wear pads of the present invention are intended for use in a conveyor assembly of the type including an inclined endless belt for receiving material to be conveyed from a chute 2 located above the belt 1. The belt 1 passes around a tail pulley 3 and a driven head pulley 4. The pulleys 3 and 4 include axles 6 and 7 mounted in pillow block bearings 8 and 9, respectively. The bearings 8 and 9 are mounted on the ends of a frame 10, which includes a plurality of legs 12 and sides 13 (only one is shown) supported by the legs.

During travel over the top of the pulleys 3 and 4, the belt 1 is supported by transition slides 14 and troughing slides 15. When passing beneath the pulleys 3 and 4 the belt is supported by return slides 17. Each of the transition and troughing slides 14 and 15 includes a frame defined by a tubular base 18 with plates 19 on the ends thereof for mounting the assembly on the main frame 10 of the conveyor. The top ends of vertical centre posts 21 extending upwardly from the middle of the base 18 are interconnected by a crossbar 22.

The belt 1 is supported by horizontal wear pads 24 and inclined wear pads 25. The wear pad 24 is mounted on the elongated horizontal crossbar 22 (the crossbar 22 is perpendicular to the travel of the belt 1). The inclined wear pads 25 are mounted on inclined elongated arms 26 connected to and extending outwardly and upwardly from the ends of the crossbar 22, supported by inclined side posts 28 extending upwardly from the ends of base 18. The basic difference between the transition and troughing slide assemblies, 14 and 15 respectively, is the angle of the inclined wear pads 25 with respect to the horizontal. The troughing wear pads and the supporting arms 26 have a greater inclination for forming a deep material conveying trough. The wear pads can be coated in Teflon™ or made of other suitable material.

The wear pads 24 can optionally include cylindrical or frusto-conical wear indicators of the types described in applicant's Canadian Patent Application 2,327,646 and U.S. Pat. No. 6,854,593, respectively.

Referring to FIGS. 2 to 7, the wear pad 24 in accordance with the present invention is comprised of an elongated rectangular parallelepipedic body with a flat, rectangular bottom surface 29 and a flat rectangular top surface 30 over which the belt 1 slides. The top of the front and rear ends 31 (the leading and trailing edges in the direction of belt travel) of the wear pads 24 are bevelled. Bores 32 in the pad 24 receive bolts 33 or plugs 46 for mounting the pad 24 on to the crossbar 22.

In one embodiment of the present invention, the wear pad 24, when mounted on the crossbar 22, sits on two spacers 35 which space the wear pad 24 from the crossbar 22 forming a gap 37. The spacer 35 is a cylinder made from Teflon™ or other material and has a bore 32 for receiving a fastener, such as the bolt 33 or plug 46.

Figure 8:
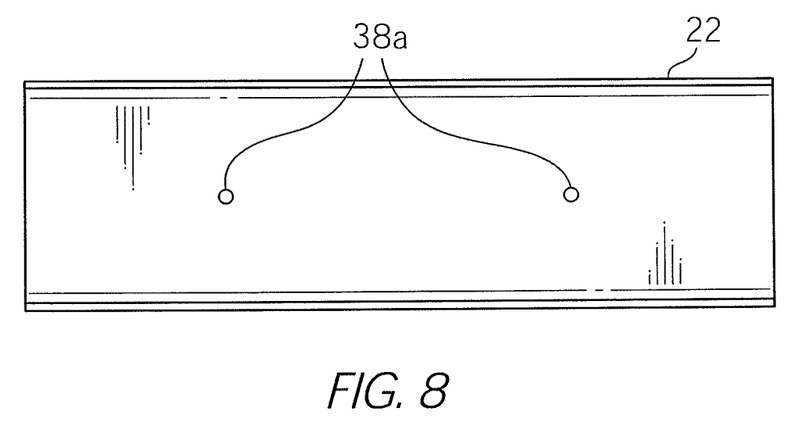
FIG. 8 is a top view of the crossbar of FIG. 3.

Referring to FIG. 8, the crossbar 22 is made from steel and is generally C-shaped in cross-section and includes two holes 38a for receiving the fastener. The inclined arms 26 also have two holes therethrough (not shown).

Figure 4:
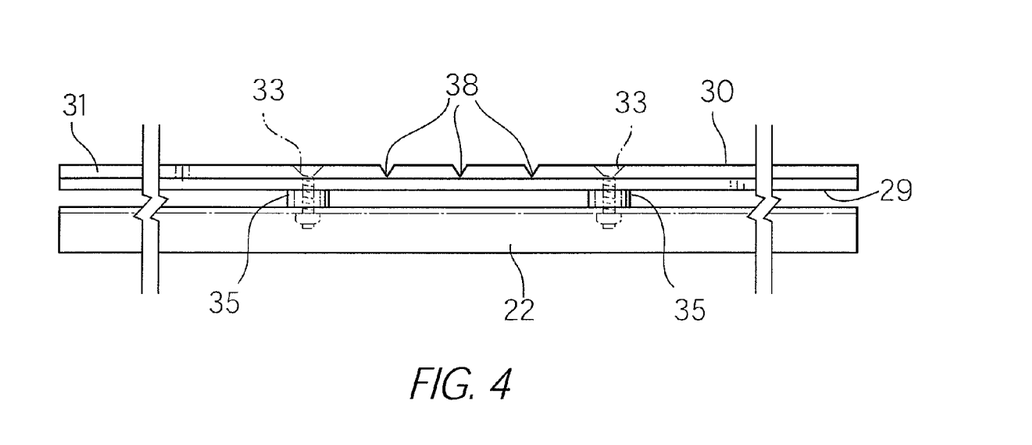
FIG. 4 is a front view of the wear pad and crossbar of FIG. 3.
Figure 5:
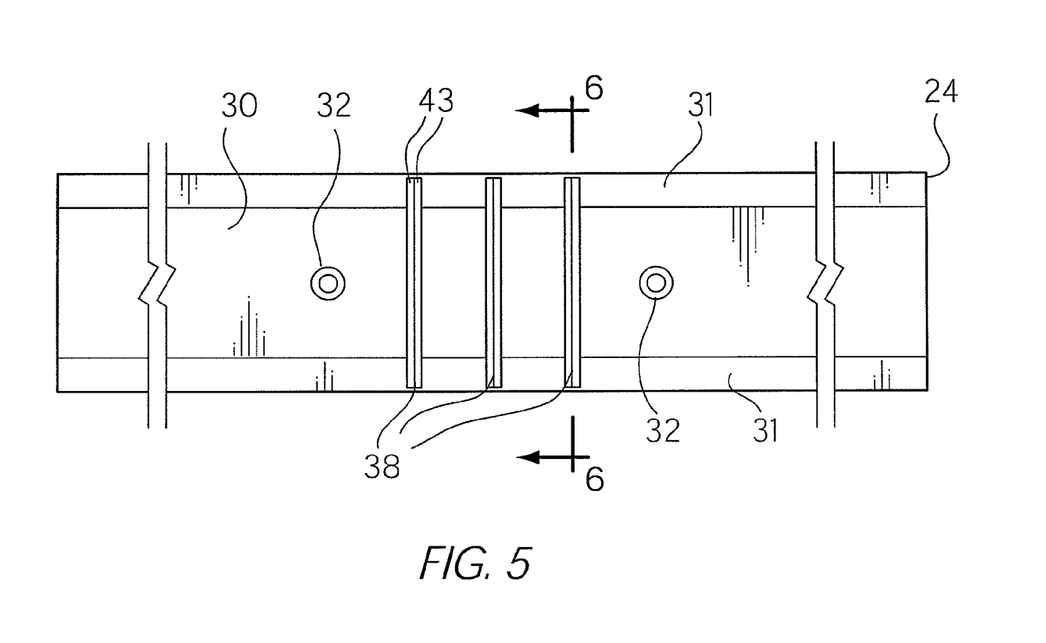
FIG. 5 is a top view of the wear pad of FIGS. 3 and 4.
Figure 6:
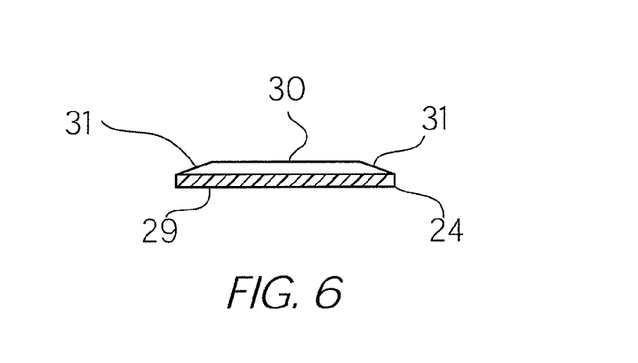
FIG. 6 is a cross-section taken along the lines 6-6 of FIG. 5.

Referring to FIG. 4, the wear pad 24 is mounted on the crossbar 22 by bolts 33 which are inserted through the bores 32, the bores in the spacers 35 and the holes 38a, and secured by nut 36 which is tightened on the bolt 33 such that the wear pad 24 and spacers 35 are securely mounted on the crossbar 22. The wear pads 25 are mounted on the inclined arms 26 in the same fashion. The wear pads may also be used with the slides disclosed in the Applicant's previously filed Canadian Application No. 2,527,295.

Figure 7:
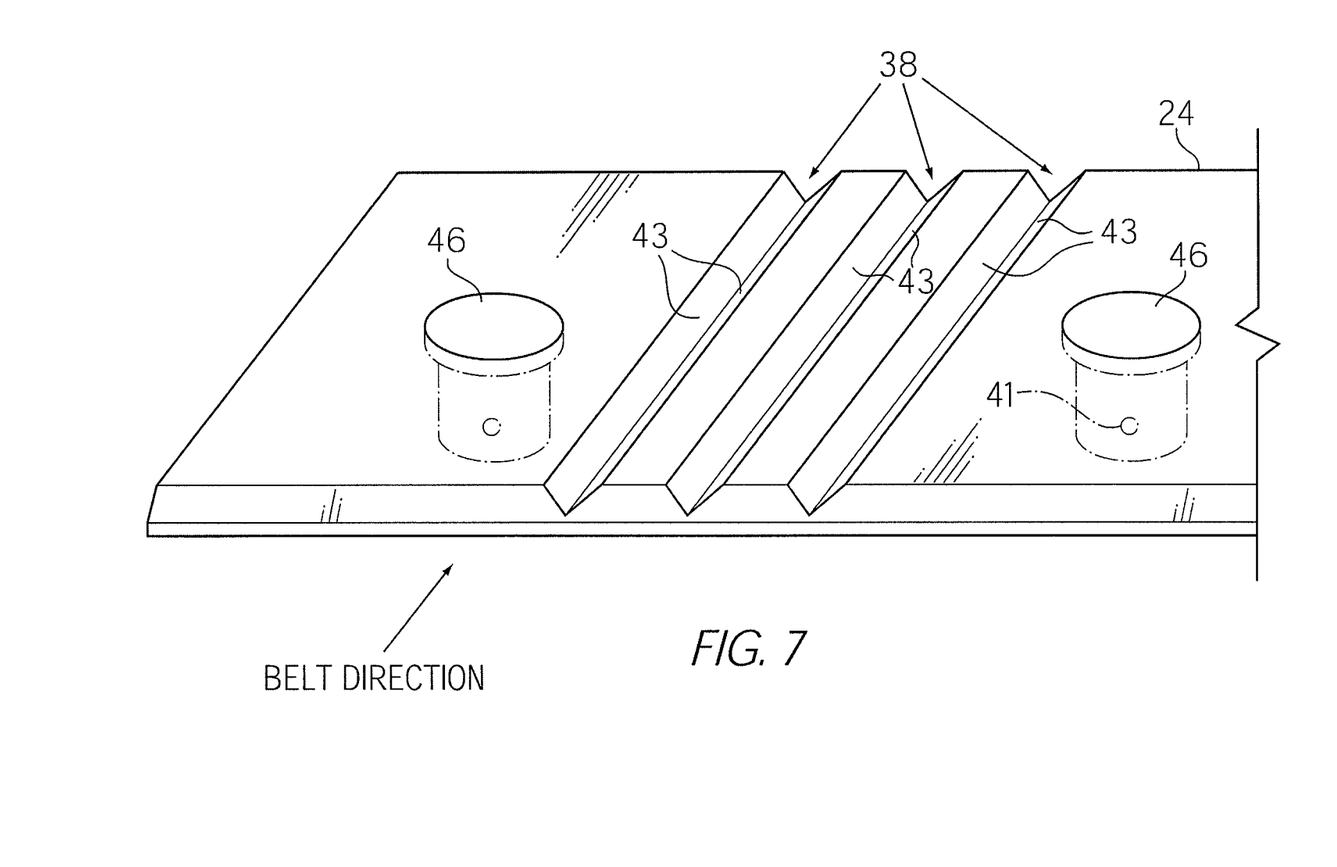
FIG. 7 is a perspective view of the wear pad FIG. 3.

Referring to FIG. 7, in an alternate embodiment, the wear pad 24 is mountable on the crossbar 22 by plugs 46.

Drag on the belt can be reduced by providing a plurality V-shaped conducting grooves 38 extending between the leading and trailing edges (in the direction of the belt travel) in the top of each wear pad 24.

The V-grooves serve to reduce the surface area of contact with the belt, permit liquid from the belt to be conducted under the belt and can serve as wear indicators (of the amount of wear of the wear pad 24 as a function of the depth of the grooves 42). The geometry of the V-grooves also helps to minimize particulates from becoming lodged in the grooves.

Referring to FIG. 7, three V-shaped conducting grooves 42 are formed in the top surface of the wear pad 24, with each of the V-shaped conducting generally at grooves 38 parallel with the adjacent groove, and spaced apart by a distance greater than the width of the grooves.

Liquid landing on the pads 24 is discharged via the V-shaped conducting grooves 38.

In one embodiment there are three conducting grooves 38 spaced slightly over an inch apart in the centre of the thirty inch long wear pad 24. It would be apparent to the person of ordinary skill in the art that additional grooves could be used in the top surface of the wear pads 24.

The wear pads 24 can also be mounted on the inclined arms 26 in place of the inclined wear pads 25.

The V-shaped conducting grooves 38 disclosed in the present application are much more suitable to avoid damage to the belt 1, than the square-shaped channels disclosed in the applicant's pending Canadian Application No. 2,552,065. For example, damage may be caused by a sharp particle which could get jammed in the square-shaped channel. The V-shaped conducting grooves 42 are formed by angled walls 43 on each side of the channel. The angled walls 43 help prevent debris from becoming stuck in the grooves because the shape of the groove allows debris to be swiped off of the wear pads 24 by the movement of the belt 1.

The V-shaped conducting grooves 38 release excess water and dust on the surface of the wear pads 24 and also act as ventilators to cool the wear pads 24. The V-shaped conducting grooves 38 also provide the end-user with an effective indicator of the amount of wear on the pads 24.

Figure 9:
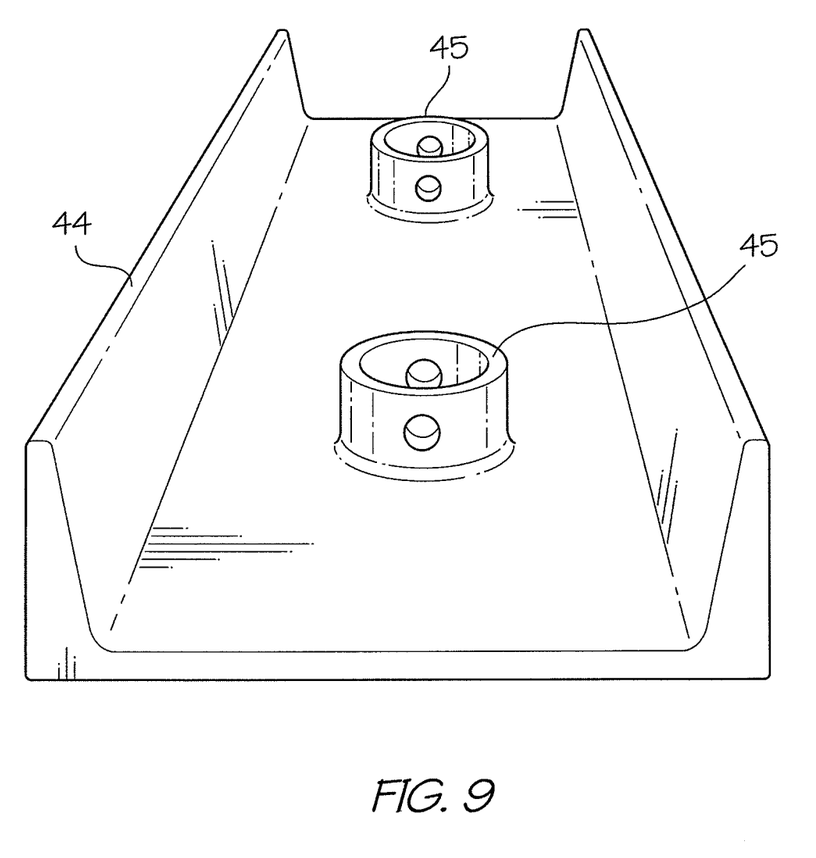
FIG. 9 is a side perspective view of a crossbar with the sleeves of the present invention formed in it.
Figure 10:
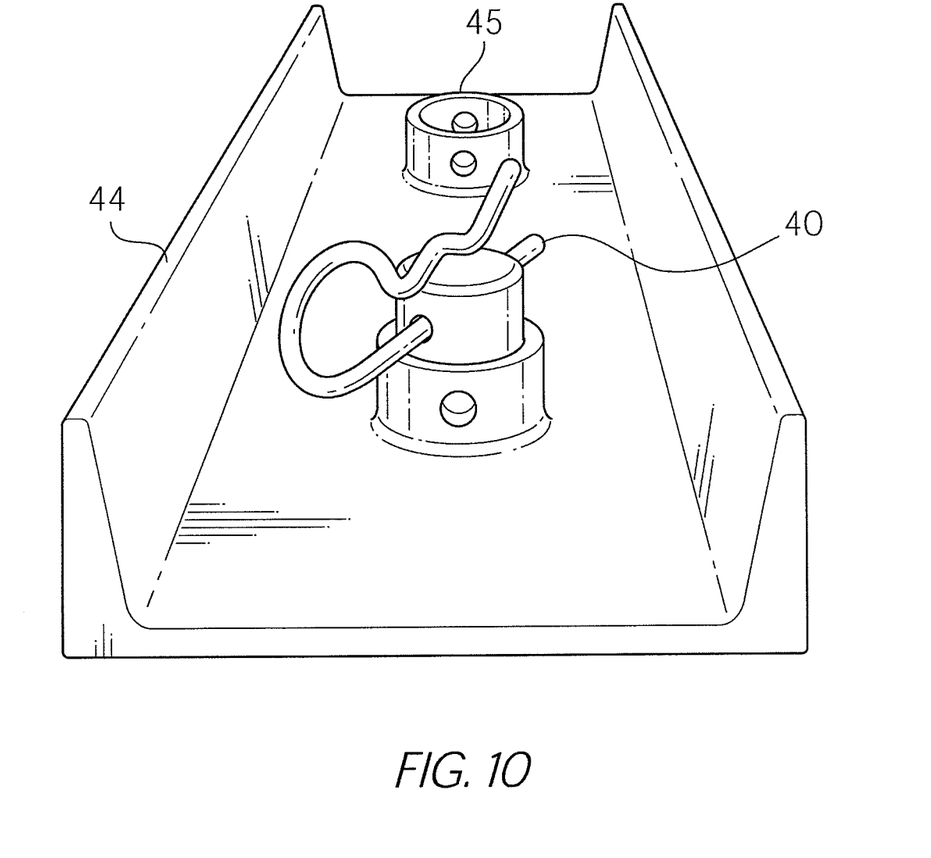
FIG. 10 is a side perspective view of the crossbar of FIG. 9 with plug and cotter pin inserted.
Figure 11:
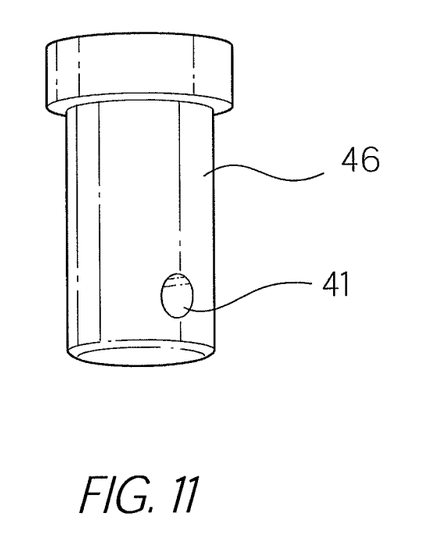
FIG. 11 is a side view of the plug of FIG. 10.

Referring to FIGS. 9 to 11, in another embodiment of the present invention, crossbar 44 is substituted for crossbar 22. Instead of having the holes 38a formed in the top of the crossbar, crossbar 44 has two sleeves 45 formed in the top surface and depending below the crossbar 44.

Plugs 46 are used in this alternative embodiment instead of the bolts 33. The plugs 46 extend through the bores 32, and into the sleeves 45 of the crossbar 44, thus mounting the wear pad 24 onto the crossbar 44. A rim (shown by a circle within the larger circle 32 in FIG. 5) extending from inside the bore 32 in the pad forms a second hole. The body of the plug 46 extends through this second hole but the head of the plug does not. When the plug 46 is fully inserted into the bore 32, the top of surface of the plug 46 is level with the top surface of the pad 24.

Optionally, a spacer can also be used to raise the pad above the crossbar. The plug 46 can be made from Teflon™ or other suitable material. The base of the plug 46 includes a bore 41 extending through the plug 46. A cotter pin 40 inserted into the bore 41, locks the wear pad 24 to the crossbar 44. The sleeves 45, by forming a channel that depends below the crossbar 44, unlike the hole 38a, envelopes the plug 46 as it extends through the crossbar 44, thus minimizing the exposure of the plug 46 to protect it from damage.

Figure 12:
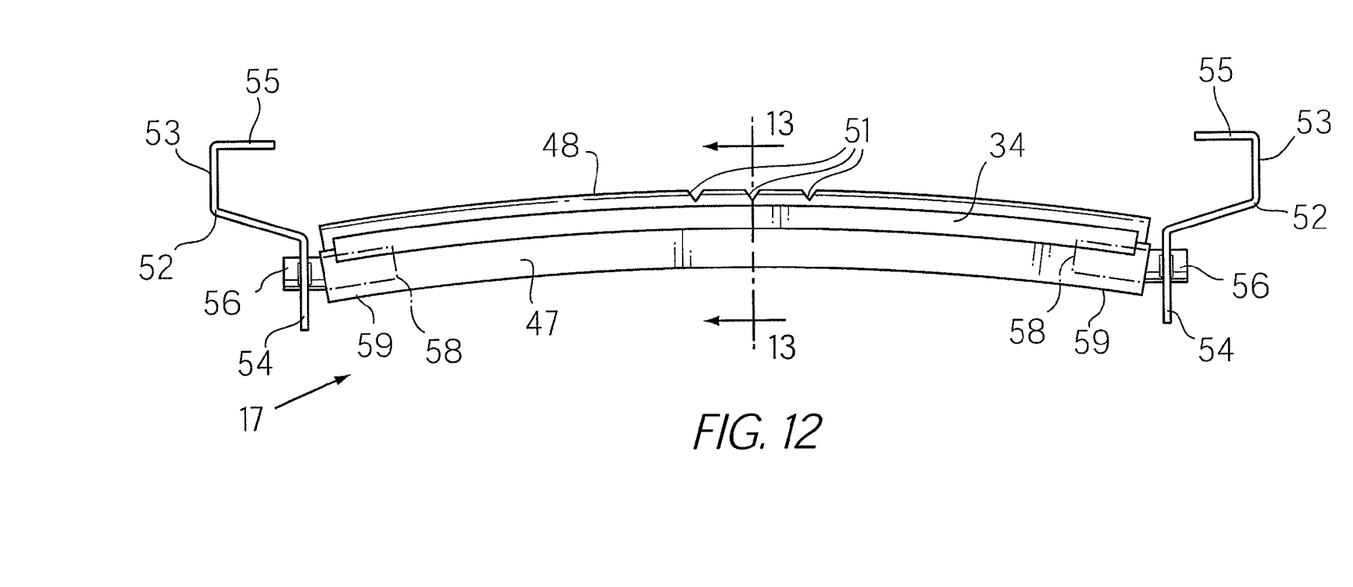
FIG. 12 is a front view of a return slide in accordance with an embodiment of the present invention.
Figure 13:
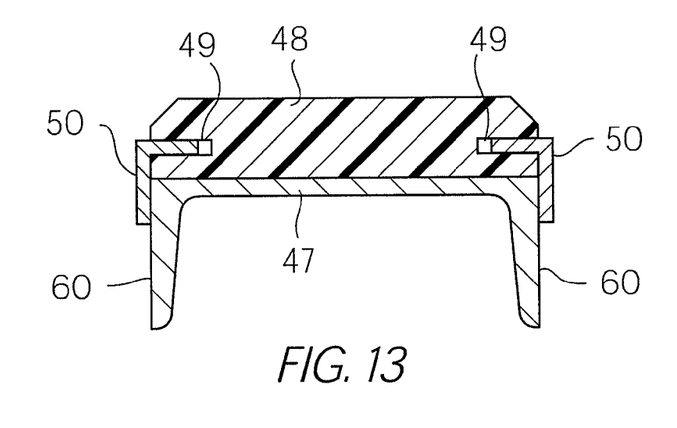
FIG. 13 is a cross-section taken along the lines 13-13 of FIG. 12.

With reference to FIGS. 12 and 13, each return slide 17 includes and elongated steel base 47 having a generally C-shaped cross-section. The base 47 is arcuate, i.e. upwardly bowed or convex when viewed from the front or rear. A wear pad 48 mounted on the base 47 is also convex when viewed from the front or rear. Longitudinally extending grooves 49 in the sides of the pad 48 receive inverted L-shaped brackets 50 for retaining the wear pad 48 on the base 47. The use of a return wear pad 48 with a top surface, which is convex in a direction perpendicular to the direction of travel of the conveyor belt 1 beneath the rollers 3 and 4 substantially reduces wear on the edges of the belt 1. It will be appreciated that, when passing around the driven roller 4, the belt 1 tends to be concave even after the contents of the belt have been dropped. Thus, when it passes beneath the roller 4, the belt 1 tends to define a shallow, transversely extending inverted trough. The wear pad 48 accommodates this belt configuration, reducing belt wear. It will also be appreciated that neither the base 47 nor the wear pad 48 need be arcuate. It is merely necessary for the top, belt engaging surface of the pad 48 to be bowed upwardly perpendicular to the path of travel of the belt 1 beneath the rollers 3 and 4.

Figure 14:
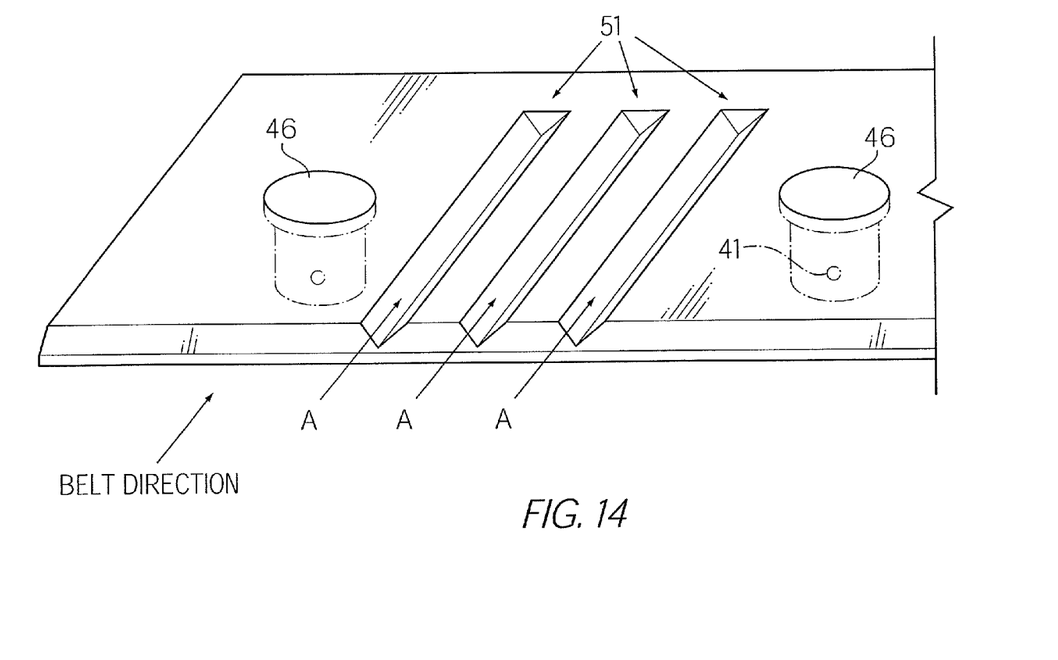
FIG. 14 is a perspective view of the wear pad of FIGS. 12 and 13.
Figure 15:
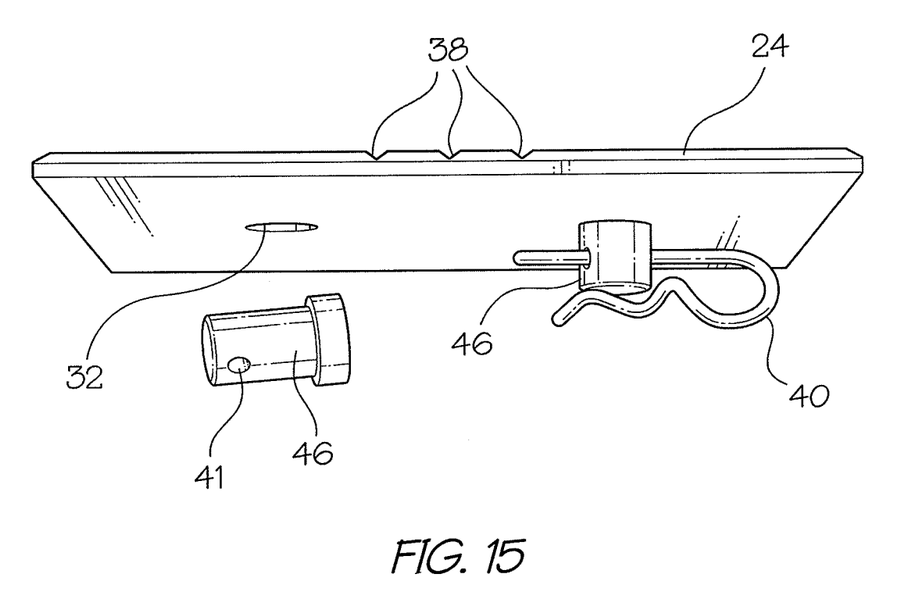
FIG. 15 is a side perspective view of the wear pad of FIG. 7.

With reference to FIGS. 12 and 14, an embodiment of the return wear pad 48 of the present invention is disclosed as having a plurality of grooves 51 formed in the surface which comes into contact with the belt 1.

In one embodiment, the grooves 51 in return slide 17 extend from the leading edge to the trailing edge of the return slide 16. In the embodiment shown in FIG. 14, the grooves 51 extend from the trailing edge (and thus are open at the trailing edge), but do not extend the full length of the wear pad to the leading edge. Therefore, the grooves 51 have a closed end in the direction of the belt 1, in the middle of the wear pad 48. Preferably, the grooves are 5.5 inches in length, and are 2 inches apart.

In the embodiment of FIG. 14, when the belt 1 reaches its top speed, it creates an air flow (indicated by A) that will enter the grooves 51, and by reason of the grooves 51 being closed at the one end, the air will release itself by creating pressure that lifts the belt 1 slightly from the wear pad 48, thus reducing friction. This friction reduction increases the durability and longevity of the return slide at high belt speeds, such as 600 feet per minute.

The base 47 is suspended from the sides 13 of the conveyor frame 10 by hangers 52. Each hanger 52 includes a metal plate which is bent to define a large downwardly tapering, vertical top end 53, a central inclined web (not shown) and a smaller downwardly tapering bottom end 54. A rectangular flange 55 extends inwardly over the web at the top of the hanger. Holes (not shown) in the flange 55 receive bolts or screws (not shown) for suspending the hangers from the frame sides 2.

A keyhole slot (not shown) in the bottom end 54 of the hanger receives one end 56 of a short bar 57, the other/inner end 58 of which supports one end 59 of the slide base 47. In the use position, the outer end 56 of the bar 57 is horizontal, and the inner end 59 is inclined slightly upwardly to match the slope of the base 47. The outer end 56 of the bar 57 includes diametrically opposed flats, i.e. notches (not shown) for locking the bar in the slot.

The return wear pad may be used with various return slides, such as that disclosed in the applicant's pending Canadian Application No. 2,517,766.

What is claimed is:

1. A wear pad for use on a slide of an endless track conveyor belt comprising an elongated body having a flat top surface for slidably supporting a conveyor belt during travel of the belt over the top surface between leading and trailing edges of the top surface; and a plurality of grooves having V-shaped cross-sections in said top surface extending between the leading and trailing edges of the body for discharging liquid falling onto the top surface, whereby drag between the wear pad and the belt is reduced.

2. The wear pad of claim 1, wherein said leading and trailing edges of said body are bevelled, and said grooves extend between said bevelled edges.

3. The wear pad of claim 2, wherein said grooves are parallel and spaced apart by a distance greater than their width.

4. The wear pad of claim 1, wherein said grooves extend from the leading edge of the body part way towards the trailing edge of the body.

5. A slide for use on an endless belt conveyor, the slide comprising:
   a crossbar extending perpendicular to the path of travel of the endless belt;
   a wear pad on the crossbar having an elongated body with a flat top surface between leading and trailing edges of the top surface and extending perpendicular to the path of travel of the belt for slidably supporting a conveyor belt during travel of the belt over the top surface;
   a plurality of grooves having V-shaped cross-sections in the top surface extending between the leading and trailing edges of the body for discharging liquid falling onto the top surface; and
   a locking means for securing the wear pad to the crossbar.

6. The slide of claim 5, wherein the locking means is a cotter pin.

7. The slide of claim 5, wherein the wear pad comprises at least one hole defined therethrough by an inner wall of the wear pad and aligned with at least one hole defined by an inner wall of the crossbar; and
   a plug in the at least one hole of the wear pad, the plug extending into the at least one hole of the crossbar.

8. The slide of claim 7, wherein the crossbar comprises at least one sleeve on a top surface of the crossbar with an open top and bottom formed into it and depending below the crossbar,
   whereby the at least one sleeve formed in the crossbar protects the plug from exposure and minimizes the damage that can arise to the plug.

9. The slide of claim 7, wherein the plug is made from Teflon™ or other suitable material.

10. A wear pad for use on a return slide of an endless track conveyor belt, the wear pad extending perpendicular to the path of travel of the belt and comprising:
    a top surface being convex along its length for positioning beneath the endless belt and having a trailing and leading edge, perpendicular to the path of travel of the belt;
    a plurality of grooves formed in the top surface of the wear pad;
    the plurality of grooves having an open end at the trailing edge of the wear pad and extending along the top surface of the wear pad parallel to the direction of the endless belt; and
    the plurality of grooves having an open end extending from the trailing edge of the top surface of the wear pad and a closed end terminating in the top surface of the wear pad prior to the leading edge.

11. The wear pad of claim 10, wherein the plurality of grooves have V-shaped cross-sections.

\* \* \* \* \*